Patented Nov. 20, 1951

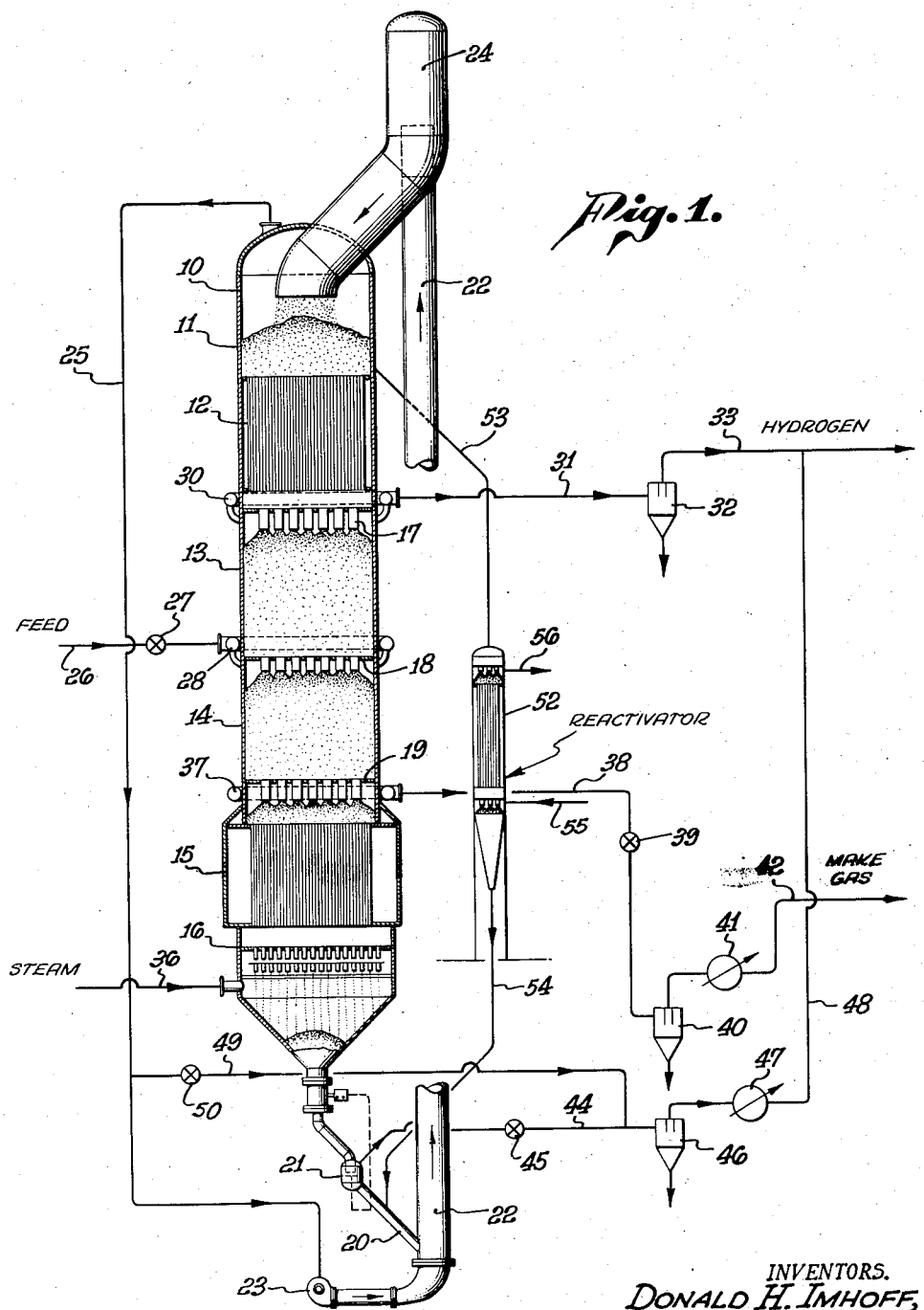

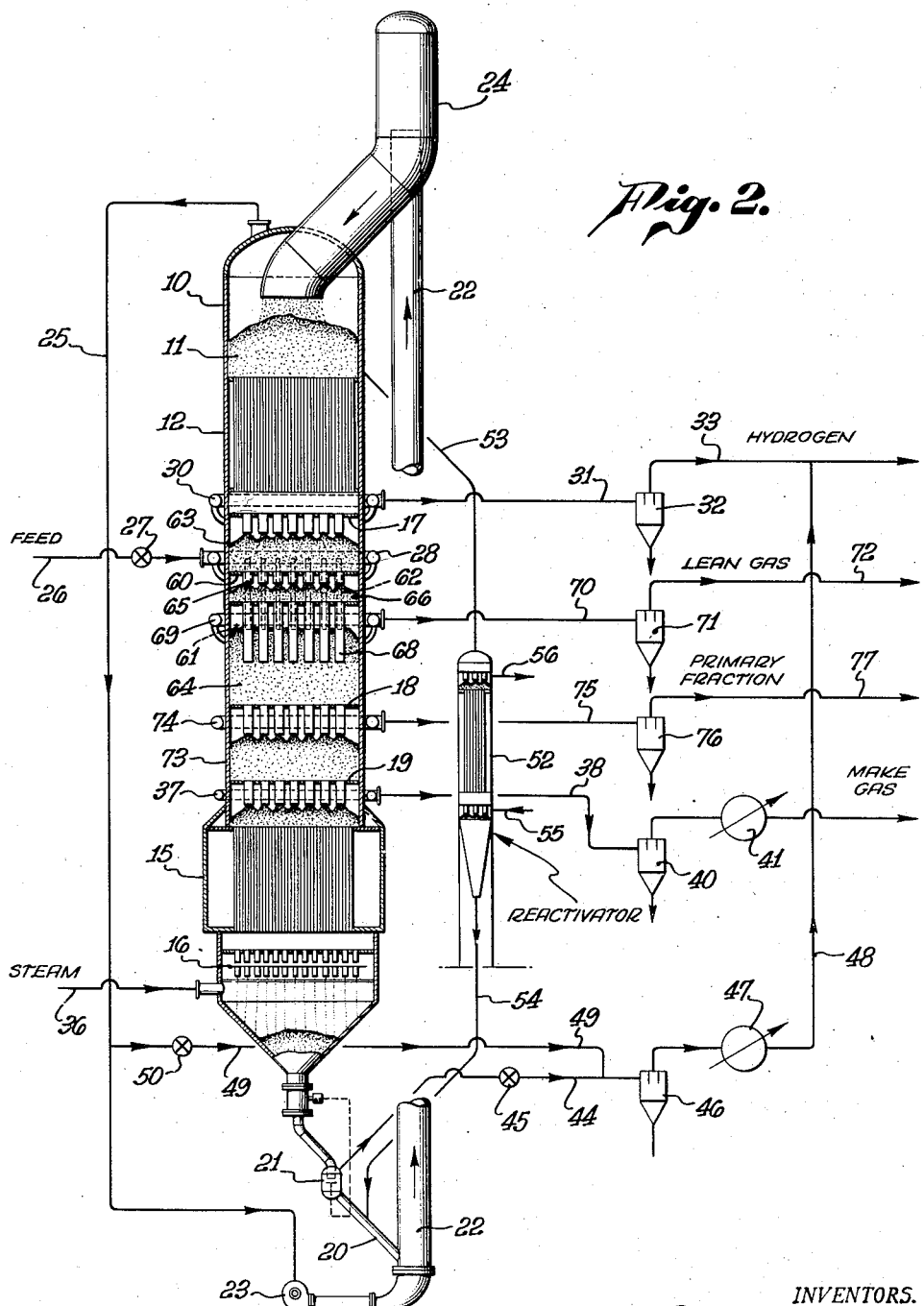

2,575,519

UNITED STATES PATENT OFFICE 2,575,519

ADSORPTION PROCESS

Donald H. Imhoff and Clyde H. O. Berg, Long Beach, Calif., assignors to Union Oil Company of California, Los Angeles, Calif., a corporation of California Application July 9, 1946, Serial No. 682,206

6 Claims. (Cl. 183—114.2)

This invention relates to the separation of gaseous mixtures by selective adsorption of certain of the components of such mixtures on a solid adsorbent. This invention is directed particularly to the separation of hydrogen from gaseous mixtures in which it is contained by selective adsorption of the other gases in the mixture on granular charcoal.

The importance of hydrogen to industry in general for hydrogenation or reduction reactions, ammonia synthesis, hydrocarbon conversions, and the like, is too well known to be worthy of extensive discussion. However, of an importance equivalent to that of its usage, is the means of obtaining hydrogen in comparatively pure form.

Hydrogen is obtained synthetically by numerous processes including the water gas or Bosch process, the thermal decomposition of hydrocarbons, the reforming of hydrocarbons with steam, and the like. Of perhaps equal importance to the above processes is the occurrence of hydrogen as a by-product in many thermal and catalytic industrial reactions. Thus, in any dehydrogenation process and in many reforming processes there is produced, as a by-product, a considerable quantity of hydrogen in association with normally gaseous hydrocarbons or other contaminating gases. Regardless of the source of the hydrogen there is generally encountered the difficult problems of recovery and purification thereof from other gases with which it is associated. Thus hydrogen is produced industrially in combination with such other gases as nitrogen, oxygen, carbon monoxide, carbon dioxide, methane and other hydrocarbon gases, sulfur dioxide, hydrogen sulfide, carbon disulfide, and the like, either individually or in plural combination.

Purification of commercial hydrogen is as important a problem as the generation or production of the gas in quantity. Thus, for example, in ammonia synthesis traces of oxygen or carbon monoxide exercise a very adverse effect on the synthetic operation. Also in the hydrogenation of oils the reaction velocity is decreased by the presence of such contaminants as the sulfides, carbon monoxide, nitrogen, carbon dioxide, and hydrocarbons. Numerous examples of the adverse effect of contaminating gases on the utilization of hydrogen could be set forth.

The processes employed in purifying hydrogen associated with various of the above named gases are in many cases complicated and expensive. Hydrogen contaminated with hydrogen sulfide and carbon dioxide is purified by passage of the gas through beds of iron oxide or of lime followed by scrubbing, in the former case, with solutions of alkalies. The removal of carbon monoxide from hydrogen is considerably more difficult in that resort must be had to complex catalytic processes involving the hydrogenation of the carbon monoxide to yield methane or the oxidation thereof to carbon dioxide which in either case necessitates the further purification of the hydrogen to remove the methane or carbon dioxide so formed. Similarly, the elimination of methane as an impurity from hydrogen is not easily accomplished. A chemical method for accomplishing this involves catalytic conversion of the methane to carbon monoxide followed by the oxidation of the carbon monoxide to carbon dioxide and the subsequent removal of the carbon dioxide by the method described above. Alternatively the methane may be separated from the hydrogen by cooling the gaseous mixture to a temperature in the neighborhood of $-184°$ C. to liquefy the methane. It is apparent that each of these processes is cumbersome and costly and similar difficulty is encountered in the separation of other gases from the hydrogen.

We have discovered that hydrogen can be effectively separated in substantially pure form from any of the above contaminating gases in a process of charcoal adsorption by the proper choice of operating conditions varying for each particular gaseous mixture to be separated.

It has long been known that certain solid adsorbents such as for example activated charcoal or silica gel will adsorb some gases such as water vapor, benzene vapor, butane, and the like, more readily than they will other gases such as hydrogen, nitrogen, carbon monoxide, carbon dioxide, oxygen, and the like, and that by heating the enriched adsorbent containing the adsorbed gases these gases may be liberated substantially completely therefrom and the adsorbent, after cooling is again capable of further selective adsorption. This had led to the development of various processes for the separation of gases involving adsorption on solid adsorbents, heating the enriched adsorbents to liberate the adsorbed gases and cooling the thus regenerated adsorbent for further use. The present invention involves a process of this type which constitutes a modification of the process disclosed in U. S. Patent 2,519,873 whereby gases heretofore considered inseparable by this means may now be separated from each other.

In general, the process of separating gaseous mixtures by selective adsorption on granular charcoal involves the steps of absorbing certain components of the gaseous mixture in a charcoal bed. In a moving bed operation the charcoal, upon which certain of the gaseous components have been adsorbed, flows from an adsorption zone through one or more rectification zones, as hereinafter described, and into a stripping section wherein the adsorbed components are desorbed from the charcoal by means of heat with the aid of a stripping gas such as, for example, steam. The stripped charcoal is subsequently cooled prior to repassage through the adsorption section. In a stationary bed operation the same series of cycles would of necessity be performed, and the same factors would be taken into consideration.

The degree of adsorbability of gases on charcoal or other adsorbents which possess the same properties as charcoal is generally thought to be higher for gases of higher molecular weight. This is found to be particularly true with regard to the gases of the hydrocarbon series. Among the non-hydrocarbon gases there has appeared to be a correlation between adsorbability and critical temperature, thus, gases of low critical temperature such as hydrogen, nitrogen, oxygen, carbon monoxide, and the like, have been considered separable from gases of comparatively higher critical temperatures such as chlorine, nitrous oxide, ammonia, and the like.

In U. S. Patent 2,519,873, an improvement in the art of selective adsorption was disclosed wherein an adsorption column was provided with two or more rectification sections whereby it is possible, through the utilization of a refluxing step within these rectification sections, not only to separate a lean gas, which in the above mentioned application constituted a fraction rich in hydrocarbons of lower molecular weight, and a make gas consisting of a fraction rich in hydrocarbons of higher molecular weight, but also one or more heart cuts consisting of fractions of relatively narrow boiling range and of intermediate molecular weight. In many cases this heart cut represents the desired product and for this reason may be referred to as the primary gas or primary fraction. In the resolution of the normally gaseous hydrocarbon fraction containing, for example, methane, butane and any or all of the aliphatic hydrocarbons intermediate between methane and butane, it is possible by the improved process above set forth to effect the separation of a fraction rich in methane, a fraction rich in ethane, a fraction rich in propane and a fraction rich in butane in one continuous adsorption column.

Thus U. S. Patent 2,519,873 was directed to the separation of gaseous mixtures by selective charcoal adsorption. The present application is directed to an improvement in the selective adsorption process with respect to the separation of fixed gases from each other. A categorical classification of the term "fixed gases," is difficult to accomplish, yet it may generally be said that the normally gaseous non-hydrocarbon compounds and elements together with methane, as the only hydrocarbon representative, fall into the fixed gas classification. Such gases as hydrogen, nitrogen, oxygen, helium, carbon monoxide, carbon dioxide, methane, hydrogen sulfide, the rare gases, and the like, are included in this definition.

It is an object of the present invention to improve upon the prior utilization of the selective adsorption process for the separation of gases by providing means whereby the heretofore difficultly separable gaseous mixtures often classified as fixed gases may be efficiently and economically resolved into individual components.

More particularly, it is an object of the present invention to provide a method whereby the charcoal adsorption process as set forth in U. S. Patent 2,519,873 may be adapted to accomplish the separation of hydrogen of extremely high purity from gaseous mixtures with which it may be associated.

It is thus a specific object of our invention to provide a method and apparatus for the recovery and purification of hydrogen from hydrogen containing gaseous mixtures.

Alternatively, it is one of our objects to provide a method of separating hydrogen from other gases in those instances when the hydrogen may be considered the contaminating component and the gas or gases associated therewith constitute the product which it is desired to recover. Thus, although the emphasis is placed herein on the separation of hydrogen in substantially pure form from contaminating gases it should not be construed that such emphasis precludes the recovery of other gases in substantially pure form which may occur in association with hydrogen as the contaminating impurity. Further, and particularly in the case of two or three component mixtures it is within the contemplation of our invention to provide means for recovering each of the components in substantially pure form from the mixture in one adsorption operation.

Other objects and advantages of our invention will become apparent to those skilled in the art as the description thereof proceeds.

In the resolution of normally gaseous hydrocarbon mixtures by the process of charcoal adsorption, the adsorption capacity of the charcoal for those components in the mixture which are necessarily adsorbed to permit the functioning of the process are sufficiently high to permit commercially feasible separation at atmospheric pressure. However, in the resolution of hydrogen from other gases of low critical temperature such as those listed above the adsorption capacity of the charcoal for any of these gases is of such a small order of magnitude that in order to effect any appreciable separation at atmospheric pressure tremendously high charcoal circulation rates were necessary. The order of magnitude of the necessary charcoal flow was sufficient to preclude the economical separation of these gases from each other at atmospheric pressure, because of the size and character of the equipment required to provide such operating conditions.

We have found that elevated pressures result in a large increase of the adsorption capacity of the charcoal for these light components. Theoretical calculations from available physical data would indicate some increase in the charcoal capacity at elevated pressures, but we have found that this increase is considerably greater than could be anticipated from these theoretical calculations.

It may be true that the selectivity of the charcoal for the individual components in any given gaseous mixture may not be improved or may even be reduced at the elevated pressures employed in our process but sufficient stages or refluxing action is furnished to overcome this possible loss in the degree of selectivity. Attempts have been made to accomplish this same effect by means of refrigeration of the charcoal and of the gaseous mixture to be separated. Refrigeration, however, represents an uneconomical means of attaining the desired end when commercial quantities of gas and charcoal must be handled. We have been able by the discovery of the principle herein set forth to eliminate the necessity of attempting the usage of refrigeration in order to provide a workable adsorption process for the purification of hydrogen and have therefore provided a commercially feasible means for separating hydrogen from gaseous mixtures which is considerably more efficient and economical than means heretofore employed.

The choice of pressures to be utilized according to our invention is a function of the composition of the particular gaseous mixture to be separated. The pressure utilized in each case is further related economically to the premissible charcoal circulation rates through the adsorption column. It is thus necessary to balance the economics of increased pressure against the economics of decreasing charcoal flow rates in order to establish a point in which the two combine to give the most satisfactory operation. Generally it may be said that higher pressures are necessary for the gases most nearly approaching hydrogen in certain of their physical properties such as molecular weight, critical temperature, and Van der Waal's constant $a$. None of these factors in themselves appear to give a precise correlation between the ease of separation of the particular component from hydrogen, but it would appear that such correlation is most nearly attained by Van der Waal's constant $a$. Thus it appears that the order of difficulty of separation of gases from hydrogen comprises nitrogen as the most difficult followed by oxygen, carbon monoxide, carbon dioxide, methane, sulfur dioxide, and hydrogen sulfide. We have found that the pressure necessary to effect efficient separation is greater for the most difficultly separable gases such as hydrogen and nitrogen, hydrogen and oxygen, and the like, than for the less difficultly separable gases such as hydrogen and hydrogen sulfide, hydrogen and methane and the like.

The process of our invention may be more readily understood by reference to the accompanying drawings in which Figure 1 is a diagrammatic view of one modification of the adsorption apparatus wherein simple two-component separation may be obtained; and Figure 2 is a diagrammatic view of another modification of the apparatus wherein the process of side cutting may be employed for the accomplishment of diverse ends as more fully set forth hereinafter.

To further clarify the process of our invention the apparatus is described with particular reference to the separation of hydrogen from a particular gaseous mixture. It is to be understood, however, that the process as set forth is not limited in its application to the particular separations employed as examples, for it is apparent from the foregoing discussion and the following description that the principles set forth are applicable to the separation of any light or fixed gases from each other by means of charcoal adsorption. Although emphasis is placed herein on the recovery of hydrogen from other gases or the recovery of other what might be termed "fixed gases" from hydrogen, such is not a necessary limitation to our process. We may equally well separate such mixtures as methane and hydrogen sulfide, nitrogen and $CO_2$, nitrogen and methane or other hydrocarbons, carbon monoxide from carbon dioxide or the like, and such separations should be considered as included by the present disclosure.

Referring to Figure 1 there is shown in vertical cross section an adsorption column 10 comprised of a charcoal hopper 11, a cooling section 12, an adsorption section 13, a rectification section 14, a stripping section 15, and a charcoal feeder 16. Between the cooling, adsorption, rectification, and stripping sections 12, 13, 14, and 15, respectively, there are disengagers 17, 18 and 19. These disengagers may be of any desired type such as the conventional tube bundles as shown in the drawing. The granular charcoal flowing through the adsorption column 10 is removed therefrom at the bottom through the transfer line 20. A level control valve 21 operated to insure a constant level of charcoal in the bottom of the column thereby giving a constant pressure drop through the transfer line 20. The charcoal flowing through the transfer line 20 is deposited in the gas lift line 22, through which lean gas is forced by means of blower 23 carrying the charcoal into the charcoal-gas separator 24. The charcoal falls into the hopper 11 and the lean gas is returned by means of the return line 25 to the blower 23. Any means of conveying the charcoal from the bottom to the top of the adsorption column such as mechanical or elevator lift or the like may be employed. We have found that the gas lift method as herein described is particularly suited to operations at elevated pressures and this method of conveyance is therefore included in the preferred embodiment of our invention.

The feed gas which in this case may be considered to be comprised of hydrogen and methane, for example, is introduced to the column by means of line 26 controlled by valve 27 through circular feed inlet manifold 28. The feed gas entering the column flows countercurrently to the charcoal through the tubes of disengager 18 into the adsorption section 13. In order to insure sufficient adsorption to separate the hydrogen from the methane, the process is carried out at a pressure in the range of about 100 pounds per square inch whereby substantially all of the methane and a portion of the hydrogen are adsorbed on the charcoal in the adsorption section 13. The unadsorbed hydrogen passes upwardly therein and is removed from the column at disengager 17 by means of the outlet manifold 30 and passes through line 31 to a separator 32, such as a cyclone separator, to remove any charcoal dust therefrom and through line 33 to production. The process is most advantageously carried out by controlling the withdrawal of hydrogen through line 31 in such a manner as to cause a portion of the hydrogen flowing upwardly in the adsorption section 13 to flow through the cooling section 12 countercurrently to the charcoal and through hopper 11 and out the lean gas line 25 into the gas lift system.

The charcoal flowing from the adsorption section 13 through disengager 18 into the rectification section 14 is substantially saturated with methane and some hydrogen. In the rectification section 14 the saturated charcoal is contacted countercurrently with additional quantities of methane released from the stripping section whereby the methane is preferentially adsorbed inducing thereby the desorption of any hydrogen contained on the charcoal. The thus desorbed hydrogen flows countercurrently to the charcoal through the disengager 18 back to the adsorption section 13 and in so doing serves to insure the retention on the charcoal of substantially all of the methane in the feed mixture whereby a purer hydrogen fraction is obtained from the adsorption section. The charcoal flowing from the rectification section 14 through the disengager 19 is thus substantially saturated with methane and contains only traces of hydrogen. The saturated charcoal then passes through the stripping section 15 and is contacted countercurrently therein with steam introduced by means of line 36 passing through the charcoal feeder 16 and countercurrently to the downwardly flowing charcoal through the tubes of the stripping section 15 wherein the methane is stripped from the charcoal and the methane and steam pass upwardly into the disengaging section formed by disengager 19. The stripping of the charcoal is effected by the combined action of a countercurrent flow of stripping steam through the tubes of the stripping section 15 and the external application of heat to these tubes by means of circulated flue gas or the like.

The requisite stripping temperature to accomplish the substantially complete removal of the adsorbed gas or gases from the charcoal appears again to be a function of the critical temperature or Van der Waal's constant $a$ of the gas to be stripped. There must also be considered the temperature necessary to prevent any appreciable adsorption and condensation of stripping steam on the charcoal. It is desirable to obtain from the stripping section charcoal substantially free of adsorbed gases and at the same time containing little if any adsorbed moisture. By carrying out the stripping process at sufficiently elevated temperatures the steam effectively strips the adsorbed gases from the charcoal without itself becoming adsorbed thereon. Thus in atmospheric pressure operation we have found it necessary to maintain the stripping section at least above about 300° F.; when operating at about 100 pounds per square inch gauge (p. s. i. g.) at least above about 430° F.; and at about 200 p. s. i. g. at least above about 500° F.

The nature of the gaseous component to be stripped is also of importance in ascertaining the proper stripping temperature. The heavier gases or those having a higher critical temperature may require stripping temperatures considerably above the minimum steam temperatures. Thus methane, for example, is preferably stripped from the charcoal at temperatures in the range of about 50° F. to 100° F. above the minimum steam temperature at each operating pressure. Carbon monoxide, however, which has a lower critical temperature and lower Van der Waal's constant $a$ than methane is more readily stripped from the charcoal and stripping temperatures more nearly approaching the minimum steam temperatures may be employed.

A part of the methane steam mixture flowing upwardly from the stripping section into the free space formed by disengager 19 is removed from the column by means of the outlet manifold 37 and line 38, controlled by valve 39 and is passed into the separator 40 wherein any charcoal dust is separated from the gases. From separator 40 the methane-steam mixture is passed through the condenser 41 to separate the steam from the methane and the methane is taken to storage through the make-gas line 42.

As above indicated only a part of the methane-steam mixture originating in the stripping section is removed from the column at the outlet manifold 37. The remaining portion of this mixture is caused to flow countercurrently to the charcoal through the tubes of disengager 19 into the rectification section 14 to there provide methane reflux to effect the desorption of any hydrogen on the charcoal as above described.

The stripped charcoal flows from the stripping section 15 to the charcoal feeder 16 which controls the rate of flow of charcoal through the column and may be of any desired type, passes therefrom into the bottom of the column wherein a constant level of charcoal is maintained by the level controller 21. The charcoal feeder 16, as shown in the drawing comprises a plurality of oscillating tube bundles which alternately load and discharge charcoal at a rate depending upon the oscillation period. The level controller 21, located in the discharge line at the bottom of the column comprises an air or electrically operated valve sensitized by the static head of charcoal supported in the lower portion of the column. Although particular means of controlling the rate of charcoal flow and the charcoal level in the bottom of the column have been shown, it is apparent that the present invention does not depend upon the usage of the particular means shown and any such means are included in the scope thereof.

To insure the removal of any residual amounts of steam from the charcoal passing through the transfer line 20, a portion of the lean gas which in the present instance would be hydrogen is caused to flow from the gas lift line 22 countercurrently to the charcoal in the transfer line 20 so as to carry any steam contained thereon back to the level control valve 21 through line 44 controlled by valve 45 into the separator 46, to separate charcoal dust from the vapors, and through condenser 47 to separate the water vapor from the hydrogen, the latter passing through line 48 to the hydrogen production line 33.

To control the quantity of lean gas in the gas lift system, which quantity is constantly being increased by the flow of lean gas from the adsorption section through the cooling section and hopper into the lean gas system, a bleed line 49 controlled by valve 50 is provided whereby any desired amount of the lean gas may be withdrawn from the lean gas lift system. The thus withdrawn lean gas is passed through separator 46, condenser 47 and hydrogen line 48 into the hydrogen production line 33.

The adsorption process is, from an economical standpoint, carried out at a temperature in the range of atmospheric temperatures. As pointed out above the utilization of high pressure adsorption obviates the necessity of extremely low temperature adsorption or fractionation. By the same token lower temperatures favor the charcoal adsorption process even when operated at elevated pressures. For this reason high temperatures, having the opposite effect, are to be avoided wherever possible.

Depending upon the composition of the gas adsorbed on the charcoal a certain amount of polymerization unavoidably occurs at the temperatures encountered in the stripping section which interferes after extended usage with the adsorptive capacity of the charcoal. To continuously counteract this effect a charcoal reactivator 52 is provided whereby a small proportion of the total charcoal may be continuously withdrawn from the hopper 11 by means of line 53, passed through the reactivator 52 and returned to the main charcoal system by means of line 54, emptying therefrom into transfer line 20. The reactivator 52 comprises essentially a high temperature stripping section wherein steam at temperatures considerably higher than those employed in the stripping section is introduced by means of line 55 and is withdrawn after passage countercurrently to charcoal in the reactivator by means of line 56. In this manner any accumulated deposits are removed from the charcoal which is restored substantially to its original activity.

The efficiency of the process of our invention and the difficulty of effecting the same separation at atmospheric pressure may be more fully appreciated from the following examples:

EXAMPLE I

In one operation in an apparatus similar to that described a gaseous mixture consisting of 60% by weight of hydrogen and 40% by weight of methane was introduced to the adsorption section of the adsorption column. At atmospheric pressure, in order to obtain a lean gas of 99.9% hydrogen purity, a charcoal circulation rate of approximately 1900 pounds of charcoal per hour per thousand cubic feet of gaseous feed was required. To one skilled in the art it will be immediately apparent that commercially such a process would be completely impracticable for the upper limit of permissible charcoal flow rates in commercial operation would be in the range of about 900 to 1,000 pounds per hour per MSCF of feed.

We have found that a hydrogen lean gas of 99.95% purity could be obtained from the same feed at 115 pounds per square inch gauge pressure with a charcoal circulation rate of only 550 pounds of charcoal per hour per MSCF of feed. Thus the efficacy of elevated pressure was found to be many times greater than could be anticipated and for this reason permits a separation at reasonable pressure which otherwise would appear to be impossible.

EXAMPLE II

The feed gas obtained from a catalytic cracking process comprising 34% hydrogen, 65.1% methane, and traces of $C_2$ hydrocarbon was separated by the process of our invention under a pressure of 110 pounds per square inch gauge and with a charcoal circulation rate of 600 pounds per hour per MSCF of feed gas. The composition of the feed of the lean gas and of the make gas are shown in Table 1.

TABLE 1
Composition of gas streams, mol percent

| | Feed | Lean Gas | Make Gas | Charcoal |
|---|---|---|---|---|
| $H_2$ | 34.0 | 99.9 | .2 | |
| $C_1$ | 65.1 | .1 | 98.50 | Circulation at 110# gauge, 600# per MSCF Feed. |
| $C_2$ | 0.7 | | 1.0 | |
| $C_2$ | 0.2 | | .3 | |

EXAMPLE III

To illustrate the ability to separate hydrogen and carbon monoxide according to our invention a feed gas containing both hydrogen and carbon monoxide and some methane was separated at atmospheric pressure, and to give a lean gas composition of 99% hydrogen there was required a charcoal circulation rate of 4500 pounds per hour per MCF of feed. This rate is better than four times the permissible commercial upper limit as above indicated. In one operation the same gaseous mixture was introduced into the adsorption column at a pressure of 180 pounds per square inch gauge and at atmospheric temperature and there was employed a charcoal circulation rate of 900 pounds per hour per MCF of feed. The composition of the feed, the lean gas and the make gas are shown in Table 2.

TABLE 2
Composition of gas streams, mol percent

| | Feed | Lean Gas | Make Gas |
|---|---|---|---|
| $H_2$ | 77 | 99.4 | .2 |
| $CO$ | 21.0 | .5 | 93.0 |
| $C_1$ | 1.5 | .1 | 6.8 |

Pressure 180# gauge.
Charcoal circulation: 900# per MSCF at 180# gauge; 4500# per MSCF at atmospheric pressure.

EXAMPLE IV

As an example of the separation of carbon dioxide from hydrogen, a feed gas consisting predominantly of a mixture of these two components was introduced into the adsorption column under a pressure of 105 pounds per square inch gauge and there was employed a charcoal circulation rate of 410 pounds per hour per MSCF of feed. Table 3 gives the composition of the feed, lean gas, and make gas streams from this separation.

TABLE 3
Composition of gas streams, mol percent

| | Feed | Lean Gas | Make Gas |
|---|---|---|---|
| $H_2$ | 81 | 99.7 | .5 |
| $CO_2$ | 19 | .3 | 99.5 |

The same separation between hydrogen and carbon dioxide as performed above would require, at atmospheric pressure, a charcoal circulation rate of approximately 1600 pounds per hour per MSCF of feed.

The ability to separate carbon monoxide and carbon dioxide from hydrogen as illustrated in Examples III and IV has made possible a simplification of hydrogen production by hydrocarbon reforming. The production of hydrogen by the reforming of hydrocarbons in the presence of steam presently necessitates a multiplicity of repetitive operations in order to produce hydrogen of satisfactory purity. Hydrocarbons together with steam are passed through a reforming furnace at a temperature of 1400° F. to 1800° F. The reforming is accomplished in the presence of a reforming catalyst, generally a nickel catalyst, to produce hydrogen, carbon monoxide and carbon dioxide. The proportion of unreacted hydrocarbon appears to be a function of the reforming temperature and approaches zero at temperatures of 1500° F. to 1800° F. It is to be understood that reference to a nickel catalyst is for the purpose only of illustrating the general procedure, but any reforming catalyst may be employed or if desired the reforming may be thermal rather than catalytic.

The product gases from the reformer are mixed with steam and cooled to about 700° F. and are then passed through the first of a series of catalyst chambers containing carbon monoxide conversion catalyst. In these catalyst chambers, employing generally an iron oxide catalyst promoted by various chromium compounds, the water gas shift reaction takes place whereby the carbon monoxide and steam react to form carbon dioxide and hydrogen. Again any conversion catalyst may be employed with the above specified type representing the preferred catalyst.

Inasmuch as only the equilibrium conversion can be attained in any one reaction stage it is necessary, after scrubbing the carbon dioxide from the reactants, to repeat the shift reaction in order to produce hydrogen of high purity. In many processes this cycle of shift reaction followed by scrubbing to remove carbon dioxide is repeated three or more times before hydrogen of the desired purity is obtained. The removal of carbon dioxide from the reactants after each conversion reaction involves a countercurrent extraction with a solvent, at the same time selective for carbon dioxide and regeneratable for repeated usage. Such a solvent as monoethanolamine has found widespread usage for this purpose.

By the utilization of our process of charcoal adsorption in conjunction with the hydrocarbon reforming it is possible to eliminate many of the steps of the operation without sacrifice of hydrogen purity. Thus, if the reforming is carried out at temperatures conducive to the substantially complete conversion of the methane, ethane, propane or other hydrocarbon employed, the reactants, consisting almost entirely of hydrogen, carbon monoxide, and carbon dioxide, may, after cooling, be fed directly to the charcoal adsorption column. In the charcoal adsorber the gases may be split into three fractions, one as a lean gas fraction consisting of substantially pure hydrogen, a second as a side cut or heart cut fraction consisting of comparatively pure carbon monoxide, and a third as a make gas or stripper gas consisting of comparatively pure carbon dioxide. The carbon monoxide fraction together with added steam is subsequently passed to a catalytc converter, as above described, where, by virtue of the absence of any substantial quantities of carbon dioxide in this fraction, the equilibrium conversion to hydrogen and carbon dioxide is more nearly obtained. The reactants from the water gas shift reaction are recycled and introduced to the charcoal adsorption column together with the cooled effluent from the hydrocarbon reformer. The operation of the charcoal adsorption process so as to obtain a heart cut or side cut fraction has been fully described but it is worthy of notice that any hydrogen which may be obtained as an impurity in the side cut carbon monoxide fraction will, after passage through the carbon monoxide converter, be recycled to the charcoal adsorption process. Thus, by so combining and connecting the hydrocarbon reforming and water gas shift reactions with the charcoal adsorption process we are able to obtain in a highly simplified process a practically 100% recovery of substantially pure hydrogen.

In an alternative method of associating the process of the present invention with the important reforming process, the shift reaction may be interceded between the reformer and the charcoal adsorber. This type of combination is of particular value when the reformer is operated at lower temperatures and appreciable quantities of methane appear in the reactants therefrom. In this method of hydrogen production the cooled effluent from the reformer is introduced together with steam into the carbon monoxide converter wherein, as above described, the water gas shift reaction takes place to convert a large part of the carbon monoxide to carbon dioxide. The effluent from the converter is cooled and introduced into the charcoal adsorber wherein three fractions are again obtained; one fraction as a lean gas consisting of substantially pure hydrogen, a second fraction as a side cut comprising predominantly methane and carbon monoxide, and a third fraction from the stripper consisting of carbon dioxide. The side cut fraction is recycled to the reforming furnace to reform the hydrocarbon and passes therefrom with the total reaction products to the carbon monoxide converter. In this manner of operation none of the hydrogen nor the potential hydrogen producers, i. e., hydrocarbon and carbon monoxide are lost, and the only products withdrawn from the process are hydrogen and carbon dioxide.

Other combinations, fractions and recycles may be proposed whereby the charcoal adsorption process may be advantageously employed in association with the hydrocarbon reformer and the carbon monoxide converter, and it is within the scope of the invention to include any and all of such combinations. In its simplest aspects the reformer and charcoal adsorber may be associated in the absence of a carbon monoxide converter whereby a hydrocarbon fraction may be recovered in the adsorber and recycled to the reformer. The carbon oxides may be discarded or subsequently introduced in a carbon monoxide converter to produce more hydrogen. In such case the effluent from the converter will be introduced to a second adsorption column to recover the hydrogen and a fraction rich in carbon monoxide which may be recycled to the converter in order to produce all of the potentially available hydrogen and at the same time to preclude the possibility of loss of any hydrogen which may be obtained as an impurity in the carbon monoxide fraction.

The process as set forth has, up to this point, shown a method of separating a hydrogen-rich fraction from a mixture of what might be considered fixed gases, in those cases wherein the primary purpose of the separation was to obtain hydrogen in substantially pure form. In many industrial processes, and this is particularly true in the petroleum industry, hydrogen occurs in conjunction with valuable hydrocarbons as a gaseous reaction product. Thus in catalytic cracking there is frequently obtained a gaseous fraction consisting of hydrogen, methane, ethylene and possibly other hydrocarbons such as propane, propylene and butanes. Dependent, of course, upon the relative concentrations of each of these components it is oftentimes found, and particularly in those cases where the reaction was carried out to produce the hydrocarbons, that the component most desired to separate from this mixture is ethylene or some other hydrocarbon gas. In the aforementioned U. S. Patent 2,519,873 is disclosed means whereby a substantially pure ethylene fraction may be obtained from a gaseous mixture such as the one herein under consideration. We have now, however, found that by combining the elements of that process with the newly discovered elements of the present disclosure that we may obtain in the same operation a substantially pure hydrogen fraction as a by-product from the separation of what may be considered the primary gas. Thus, in the example under consideration ethylene is to be substantially completely recovered in comparatively pure form and as such constitutes the primary fraction, while only a portion of the hydrogen is to be recovered as a substantially pure fraction and as such constitutes the by-product fraction. Such a modified adsorption process can best be understood by reference to the accompanying Figure 2, wherein the relation to the description thereof a gaseous fraction of hydrogen, methane, ethylene and heavier hydrocarbons will be considered.

Many of the elements of the apparatus of Figure 2 are identical to those of Figure 1 and will be therefore given identical numbers. Thus, in Figure 2 there is shown the adsorption column 10 containing the charcoal hopper 11, cooling section 12, stripping section 15, charcoal feeder 16, disengager 17, the charcoal transfer line 20, the level control 21, charcoal gas lift line 22, blower 23, the charcoal-gas separator 24 and other identical elements which will be brought in as the description proceeds.

Feed such as that described is introduced by means of feed line 26, controlled by valve 27 into the column at a disengager 60 by means of an inlet manifold 28. The disengager 60, in this case functioning in cooperation with the disengager 61, is comprised of tubes of different lengths. The longer tubes 62 project from the adsorption section 63 into the primary rectification section 64, whereas the shorter tubes 65 project from the upper surface of the disengager 60 into a secondary adsorption section 66. A portion of the feed gas flowing into the column by means of the inlet manifold 28 flows countercurrently to the charcoal through the shorter disengaging tubes 65 into the primary adsorption section 63 wherein the hydrocarbon gases are adsorbed on the charcoal leaving a portion of the hydrogen as substantially unadsorbed gas. The unadsorbed hydrogen as in the description of the process illustrated in Figure 1, is withdrawn from the column at disengager 17 by means of the outlet manifold 30, passing therefrom through line 31 and the hydrogen-charcoal separator 32 into the hydrogen make-gas line 33. The other portion of the hydrogen flowing, as unadsorbed gases, countercurrently to the charcoal through the primary adsorption section 63 passes through the cooler 12, hopper 11 and into the lean gas recycle line 25. The charcoal flowing through the shorter tubes 65 of the disengager 60 is substantially saturated with methane and heavier hydrocarbons and contains only small amounts of residual hydrogen. Thus charcoal flows through the secondary adsorption section 66 concurrently to a portion of the feed gas and from thence through the long tubes 68 of the disengager 61 into an intermediate point in the primary rectification section 64. At this point in the rectification section 64 the downwardly flowing charcoal is contacted with additional quantities of ethylene to effect the desorption of the methane and hydrogen contained on the charcoal as the result of the preferential adsorption of the ethylene. Thus, the desorbed methane and hydrogen together with any unadsorbed feed gas, flowing concurrently with the charcoal through the tubes 68, flows countercurrently to the charcoal from the point of ejection from the tubes 68 into rectification section 64 and in so doing contacts the charcoal transferred from the primary adsorption section 63 through the tubes 62 into the upper portion of the primary rectification section 64. The charcoal with which these gases come in contact in the upper portion of the rectification section 64 is, by virtue of its bypass of the secondary adsorption section 66, substantially completely saturated with hydrogen and possibly some methane. Upon contacting the ascending gases, the hydrogen and methane are desorbed from this charcoal and the heavier components in the ascending gases are preferentially adsorbed thereon. The desorbed hydrogen and methane may be removed from the column at this point by means of the outlet manifold 69, line 70 and separated from any entrained charcoal dust in separator 71 passing as an initial side cut through line 72 to storage. A portion of the desorbed hydrogen and methane will flow countercurrently to the charcoal in the tubes 62 wherein the methane will be preferentially adsorbed and the hydrogen will be free to flow through the primary adsorption section 63 into the hydrogen outlet system as described.

The charcoal flowing downwardly in the primary rectification section 64 is substantially completely saturated with ethylene and higher molecular weight hydrocarbons and is passed through the disengager 18 into the secondary rectification section 73 wherein it is contacted with additional quantities of $C_3$ and heavier hydrocarbons to effect the desorption of the ethylene as a result of the preferential adsorption of the $C_3$ and heavier hydrocarbons. A portion of the desorbed ethylene is caused to flow countercurrently through the tubes of disengager 18 back into the primary rectification section 64 so as to insure therein the above described desorption of any methane or hydrogen which may still be contained on the charcoal. The remaining portion of the desorbed ethylene is removed from the column by means of outlet 74 passing through line 75 into separator 76 wherein any entrained charcoal dust is separated from the ethylene which passes therefrom as a secondary side cut through line 77 to storage. The charcoal flowing from the rectification section 73 through the disengager 19 is saturated substantially completely with only $C_3$ and heavier hydrocarbons. This charcoal is passed through the stripping section 15 provided with steam inlet 36, as described in relation to Figure 1, and $C_3$ and heavier hydrocarbons are stripped therefrom and a portion of these stripped hydrocarbons are caused to flow countercurrently through the tubes of disengager 19 into the secondary rectification section 73 to effect the above described desorption of the ethylene contained on the charcoal therein by virtue of the preferential adsorption of the $C_3$ and heavier hydrocarbons. The remaining portion of the steam hydrocarbon mixture is removed from the column by means of the outlet manifold 37 operating in conjunction with the disengager 19, is passed through line 38 into the charcoal gas separator 40, the condenser 41 to remove the water vapor from the gases and through line 42 as a make gas to storage.

As hereinbefore described the stripping temperatures employed are a function of the minimum allowable steam temperature, the gaseous components to be stripped from the charcoal, and the pressure under which the process is carried out. In reference to the description of Figure 1 an extensive discussion of the preferred stripping temperatures for methane and other fixed gases was set forth. The same principles may be said to govern in the present case in which it is to be noted that because of the higher critical temperatures, which in the case of hydrocarbons appears to vary with molecular weight, of the gases adsorbed on the charcoal, stripping temperatures somewhat higher than those employed in the methane stripping must be used.

From this stage the process is identical to the process of Figure 1 with line 49 controlled by valve 50 being provided to withdraw the accumulated lean gas in the circulation system, line 44 controlled by valve 45 to permit the countercurrent passage of a small portion of the lean gas through the transfer line 20 to sweep any residual steam from the charcoal, separator 46 to separate any entrained charcoal dust from the combined lean gas streams, condenser 47 to separate the water vapor from the lean gas and line 48 to combine this lean gas with the hydrogen production in line 33. There is also shown the reactivator 52 with the transfer line 53 from hopper 11 and the transfer line 54 joining transfer line 20, the steam inlet line 55 and the steam withdrawal line 56.

In an alternative method of providing reflux of the stripped components in the secondary rectification section directly above the stripping section, the entire production from the stripping section may be withdrawn from the column passed through the separator 40 and the condenser 41 to dry the stripped gases and subsequently returned in part to the secondary rectification section as dry reflux. Such a procedure has the advantage of eliminating the presence of steam in the rectification section, and for this reason may be desirable to pursue, but either of these methods or any other desirable method may be employed to give the necessary reflux.

It should be understood that the description of the process as illustrated in Figure 2 with relation to a separation of hydrogen as a by-product from a gaseous hydrocarbon fraction from which a primary gas fraction is also separated is not intended to limit the process of the by-product separation of this particular fraction. Thus any mixture of fixed gases may contain one which is predominantly sought after or a primary gas and another which would be highly desirable to recover in part as a substantially pure by-product without the requirement of undergoing an independent separation process. The process as above described with relation to Figure 2 is applicable to this type of separation in any such case. In all such cases the by-product gas must be less highly adsorbed on the charcoal than the primary gas. This may be translated as previously set forth into a lower critical temperature or preferably a lower Van der Waals' constant $a$.

In the latter modification of the hydrogen separation process the question of pressure is also of material importance. Thus the separation of hydrogen from the methane as a substantially pure by-product gas is to all intents and purposes impossible if this operation were carried out at atmospheric pressure but it becomes economically feasible by virtue of the fact, as we have discovered, that an increase in pressure has a greater effect than could be anticipated; thus, the process as described with relation to the separation of hydrogen as a by-product from a gaseous hydrocarbon mixture may be operated at a pressure in the range of from about 50 to about 150 p. s. i. g. and at a preferred pressure in the range of from about 100 to 125 p. s. i. g. Pressures of greater magnitude than this, while permitting more efficient separation are not necessary although it is to be understood that such greater pressures are within the scope of our invention and particularly in those cases where the gaseous fraction to be separated is obtained from the process in which it is generated at a very high pressure.

In operating the process of the invention on a mixture comprising hydrogen, carbon monoxide, carbon dioxide, and nitrogen, pressures of a somewhat greater order of magnitude are required in order to obtain a process which is operable from the standpoint of required charcoal circulation rates. In these cases the most suitable pressure range is between about 150 pounds per square inch and about 300 pounds per square inch and preferably in the range of about 200 to 250 pounds per square inch. Here again, the magnitude of the pressure is limited only by the economics of the process and should the gaseous mixture to be separated be obtained as a high pressure gas, that is, under a pressure greater than 300 pounds, the economic picture may be shifted sufficiently to make desirable a separation at such an elevated pressure.

In short, the lowest pressure of operation permissible is a function of the requisite charcoal flow rate required to effect the desired degree of separation at the lowest pressure and may vary according to the economic picture concerning the circulation of the charcoal. The upper pressure limit is established as a function of the operational costs of processes under very high pressure and here again the economic picture may change and thus change the upper pressure limit.

The efficiency and advantages of the process according to Figure 2 to recover a fixed gas and particularly hydrogen as a by-product from a separation in which the primary object is the substantially complete recovery of another gas can be best appreciated by reference to the following example:

EXAMPLE V

In this operation a gaseous product was obtained from the catalytic cracking of a petroleum gas oil. The gaseous fraction was debutanized to yield a mixture containing substantially only $C_3$ and lighter hydrocarbons and hydrogen. The separation process was operated at a pressure of approximately 100 p. s. i. g. with a charcoal circulation rate of about 390 pounds per MSCF of feed. A by-product fraction of substantially pure hydrogen was obtained amounting to a hydrogen recovery of approximately 35%. The composition of the feed, by-product fraction, lean gas, primary fraction and make gas are given in Table 4.

TABLE 4

*Composition of gas streams, mol per cent*

| | Feed | By-Product Fraction | Lean Gas | Primary Fraction | Make Gas |
|---|---|---|---|---|---|
| $H_2$ | 15.0 | 99.5 | 25.1 | | |
| $CH_4$ | 29.1 | 0.5 | 74.0 | 1.00 | |
| $C_2H_4$ | 27.3 | | 0.7 | 66.50 | 1.0 |
| $C_2H_6$ | 11.0 | | 0.2 | 26.80 | 0.7 |
| $C_3H_6$ | 16.7 | | | 5.40 | 93.2 |
| $C_3H_8$ | 0.9 | | | .30 | 5.1 |

Similar hydrogen by-product fractions may be obtained in this manner when a different primary gas is sought to be recovered. Further, the by-product fraction may be other than hydrogen depending upon the particular gaseous mixture to be separated. It will be apparent, however, as hereinbefore stated, that the primary gas, recovered substantially completely as a pure fraction, must be one which is more readily adsorbed than the by-product gas, which is only partially recovered as a pure fraction. Further to make this latter embodiment necessary there is usually contained in the gaseous mixture one or more components which exhibit adsorption characteristics intermediate between the by-product gas and the primary gas. Thus in the above example methane exhibits adsorption properties intermediate between the primary gas, ethylene, and the by-product gas, hydrogen.

Although emphasis has been placed herein on the separation of hydrogen from gaseous mixtures it should be apparent that the emphasis was so allocated because of the present importance of hydrogen production and purification to industry. Our invention is, however, broader in its scope and teaching and includes the separation of fixed gases, as that term is herein employed, from each other. It may very well become of prime importance to separate nitrogen from various other gases such as carbon monoxide, oxygen or the like in admixture therewith either individually or collectively. The future is impossible to predict but we have disclosed a process whereby any mixture of fixed gases which may be encountered may be separated into fractions rich in particular components of the mixture.

Of present importance, however, is the separation of helium from natural gas. The conventional process involving fractional liquefaction requires, in addition to carbon dioxide extraction and drying, the usage of pressures in the neighborhood of 2700 p. s. i. g. and temperatures of approximately —312° F. The purification costs are of corresponding magnitude and we have found that by utilization of the herein described charcoal adsorption process these costs may be considerably reduced. Several alternatives may be pursued in the purification by charcoal adsorption but it appears that the optimum procedure involves a two stage operation to separate initially the helium, nitrogen and oxygen from the carbon dioxide and hydrocarbon gases and secondly to separate the helium from the nitrogen and oxygen. The second stage adsorption would involve higher pressures and charcoal circulation rates than would the first which, however, would be compensated for by the reduced volume of gas to be processed in the second stage. The exact pressure and circulation rates required for each separation are dependent upon the composition of the helium containing gaseous mixture, but it is sufficient to say that the respective separations would be analogous to the separation of hydrogen from similar mixtures and the operational variables would approximate those hereinbefore disclosed.

Having described our invention and having illustrated various embodiments and realizing that many modifications will occur to those skilled in the art without departing from the spirit or scope of our invention, we claim:

1. A continuous process for the production of hydrogen from a gaseous mixture containing hydrogen, carbon monoxide and carbon dioxide which comprises contacting said gaseous mixture with a moving stream of granular charcoal at a pressure above about 50 pounds per square inch so as to cause adsorption from said gaseous products of substantially all of the non-hydrogen gases leaving hydrogen substantially free from carbon monoxide as unadsorbed gas, separating said hydrogen from said charcoal, removing said hydrogen from said adsorption column, contacting said moving stream of granular charcoal containing adsorbed thereon said non-hydrogen gases with carbon dioxide to effect the desorption of carbon monoxide and any hydrogen which may be adsorbed thereon, removing said desorbed carbon monoxide and hydrogen from said adsorption column as a sidecut, stripping said carbon dioxide from said charcoal with steam, removing said stripped carbon dioxide from said adsorption column, conveying said charcoal from the bottom to the top of said adsorption column, cooling said charcoal and employing said cooled charcoal over again in said process.

2. A continuous process for the separation of fixed gases contained in a gaseous mixture which comprises permitting a moving bed of solid granular adsorbent to move downwardly by gravity through successive zones of adsorption, rectification, and stripping, countercurrently contacting said gaseous mixture with the moving bed of granular adsorbent in the adsorption zone so as to adsorb more readily adsorbable gases therefrom, removing unadsorbed gas from said adsorption zone, contacting the adsorbent in the rectification zone with reflux returned from the stripping zone, contacting the adsorbent in the stripping zone with steam while heating the adsorbent so as to liberate therefrom a mixture of desorbed gas and steam, removing one portion of said mixture as make gas and controlling the rate of such removal so as to force the remainder of said mixture back to the rectification zone to act as said reflux, maintaining said adsorption zone at substantially atmospheric temperature and at a pressure greater than about 50 pounds per square inch, and recirculating the adsorbent through said adsorption, rectification and stripping zones at a rate below about 1,000 pounds per hour per MSCF of fixed gas feed.

3. A process according to claim 2 in which the fixed gases comprise hydrogen and carbon monoxide, and the pressure is maintained greater than about 200 pounds per square inch.

4. A process according to claim 2 in which the fixed gases comprise helium and natural gas.

5. A continuous process for the separation of fixed gases contained in a gaseous mixture which comprises permitting a moving bed of solid granular adsorbent to move downwardly by gravity through successive zones of adsorption, rectification, and stripping, countercurrently contacting said gaseous mixture with the moving bed of granular adsorbent in the adsorption zone so as to adsorb more readily adsorbable gases therefrom, removing unadsorbed gas from said adsorption zone, contacting the adsorbent in the rectification zone with reflux returned from the stripping zone, contacting the adsorbent in the stripping zone with steam while heating the adsorbent so as to liberate therefrom a mixture of desorbed gas and steam, removing one portion of said mixture as make gas and introducing another portion to the rectification zone to act as said reflux, maintaining said adsorption zone at substantially atmospheric temperature and at a pressure greater than about 50 pounds per square inch, and recirculating the adsorbent through said adsorption, rectification and stripping zones at a rate below about 1,000 pounds per hour per MSCF of fixed gas feed.

6. A continuous process for the separation of fixed gases contained in a gaseous mixture which comprises permitting a moving bed of solid granular adsorbent to move downwardly by gravity through successive zones of adsorption, rectification, and stripping, countercurrently contacting said gaseous mixture with the moving bed of granular adsorbent in the adsorption zone so as to adsorb more readily adsorbable gases therefrom, removing unadsorbed gas from said adsorption zone, contacting the adsorbent in the rectification zone with reflux returned from the stripping zone, heating the adsorbent in the stripping zone so as to desorb more readily adsorbable gases therefrom, removing one portion of the so desorbed gases as make gas and introducing another portion to the rectification zone to act as said reflux, maintaining said adsorption zone at substantially atmospheric temperature and at a pressure greater than about 50 pounds per square inch, and recirculating the adsorbent through said adsorption, rectification and stripping zones at a rate below about 1,000 pounds per hour per MSCF of fixed gas feed.

DONALD H. IMHOFF.
CLYDE H. O. BERG.

REFERENCES CITED

The following references are of record in the file of this patent:

UNITED STATES PATENTS

| Number | Name | Date |
|---|---|---|
| 1,422,007 | Soddy | July 4, 1922 |
| 1,481,221 | Nuss | Jan. 15, 1924 |
| 1,638,684 | Edwin | Aug. 9, 1927 |
| 1,908,484 | Larson | May 9, 1933 |
| 2,070,099 | Twomey | Feb. 9, 1937 |
| 2,254,799 | Erdmann | Sept. 2, 1941 |
| 2,384,311 | Kearby | Sept. 4, 1945 |
| 2,519,342 | Berg | Aug. 22, 1950 |

FOREIGN PATENTS

| Number | Country | Date |
|---|---|---|
| 146,332 | Great Britain | Apr. 21, 1921 |
| 490,920 | Great Britain | Aug. 23, 1938 |
| 517,354 | Great Britain | Jan. 26, 1940 |

OTHER REFERENCES

"Charcoal As An Adsorbent," Natural Gas, vol. V, No. 11, November 1924, pages 3, 4, 46, 48, 50, 54, and 56.